United States Patent [19]
Smith

[11] Patent Number: 5,906,853
[45] Date of Patent: May 25, 1999

[54] METHOD FOR CONTINUOUS MANUFACTURE OF VISCOUS FOOD PRODUCTS

[75] Inventor: Gary F. Smith, Highland Park, Ill.

[73] Assignee: Kraft Foods, Inc., Northfield, Ill.

[21] Appl. No.: 09/002,224

[22] Filed: Dec. 31, 1997

Related U.S. Application Data

[63] Continuation-in-part of application No. 08/766,292, Dec. 13, 1996, abandoned.

[51] Int. Cl.$^6$ .............................. A23C 19/00; A23P 1/00
[52] U.S. Cl. .............................. 426/519; 99/348; 99/452; 366/325.5; 366/325.8; 426/511; 426/582
[58] Field of Search ..................................... 426/520, 510, 426/511, 519, 582; 99/348, 452; 366/325.4, 325.5, 325.7, 325.8

[56] References Cited

U.S. PATENT DOCUMENTS

| | | | |
|---|---|---|---|
| 771,141 | 9/1904 | Gesner | 366/149 |
| 1,522,385 | 1/1925 | Parsons et al. | 426/582 |
| 1,639,828 | 8/1927 | Wheeler et al. | 426/511 |
| 1,713,537 | 5/1929 | Kux | 99/453 |
| 1,796,445 | 3/1931 | Doering et al. | 99/348 |
| 1,861,721 | 6/1932 | Scott | 426/519 |
| 1,923,358 | 8/1933 | Eckberg | 99/348 |
| 2,021,899 | 11/1935 | Schneider | 99/348 |
| 2,917,827 | 12/1959 | Lankford | 99/348 |
| 2,939,770 | 6/1960 | Schwartzkopff et al. | 366/149 |
| 3,286,992 | 11/1966 | Armeniades et al. | 366/339 |
| 3,543,403 | 12/1970 | Speglic et al. | 426/582 |
| 3,704,006 | 11/1972 | Grout et al. | 366/339 |
| 3,773,753 | 11/1973 | Wright et al. | 426/520 |
| 3,794,300 | 2/1974 | Harder | 366/339 |
| 4,037,825 | 7/1977 | Burgert | 366/336 |
| 4,110,484 | 8/1978 | Rule et al. | 426/519 |
| 4,112,131 | 9/1978 | Bosy et al. | 426/582 |
| 4,255,459 | 3/1981 | Glen | 426/510 |
| 4,448,539 | 5/1984 | Birgert | 366/132 |
| 4,483,624 | 11/1984 | Bacon, Jr. et al. | 366/293 |
| 4,541,329 | 9/1985 | Mongiello | 99/455 |
| 4,984,514 | 1/1991 | van Legerich | 99/353 |
| 5,083,506 | 1/1992 | Horn et al. | 99/348 |
| 5,182,981 | 2/1993 | Wilcox | 99/333 |
| 5,216,945 | 6/1993 | Heyland et al. | 99/348 |
| 5,240,724 | 8/1993 | Otto et al. | 426/231 |
| 5,350,595 | 9/1994 | Hockenberry et al. | 426/582 |
| 5,470,595 | 11/1995 | Kopp et al. | 426/331 |

FOREIGN PATENT DOCUMENTS

| | | |
|---|---|---|
| 186795 | 9/1986 | European Pat. Off. . |
| 1446220 | 8/1976 | United Kingdom . |

OTHER PUBLICATIONS

Australian Dairy Foods, "Company Profile", p. 54, Apr. 1993.
Gold Peg Product Information (2 pgs) entitled "High Output—No Burning" and "A Breakthrough in Continuous Cooking" (Date Unkown).
Food Engineering, "What's New in Food Technology & Manufacturing", p. 15, May/Jun. 1994.
International Search Report dated Mar. 20, 1998.

*Primary Examiner*—George Yeung
*Attorney, Agent, or Firm*—Fitch, Even, Tabin & Flannery

[57] ABSTRACT

A method and apparatus for continuous manufacture of viscous food products such as process cheese-type products wherein a formulation is continuously pumped through a processing chamber comprising an elongated tube or housing having a rotor which shears the formulation as it travels longitudinally through the tube while imparting little or no axial motion to the formulation as a result of contact with the rotor. The temperature of the formulation as it enters the processing chamber may be in the range of about 150° F. to about 250° F., and the residence time of the formulation may be between about 30 seconds and about 8 minutes. The formulation may be subjected to shear of between 10 and 1,000 sec$^{-1}$ with an absolute viscosity $\mu$ of between about 20 and 50 poise, while the rotor is operated at a rotational velocity of between about 10 rpm and 800 rpm.

12 Claims, 2 Drawing Sheets

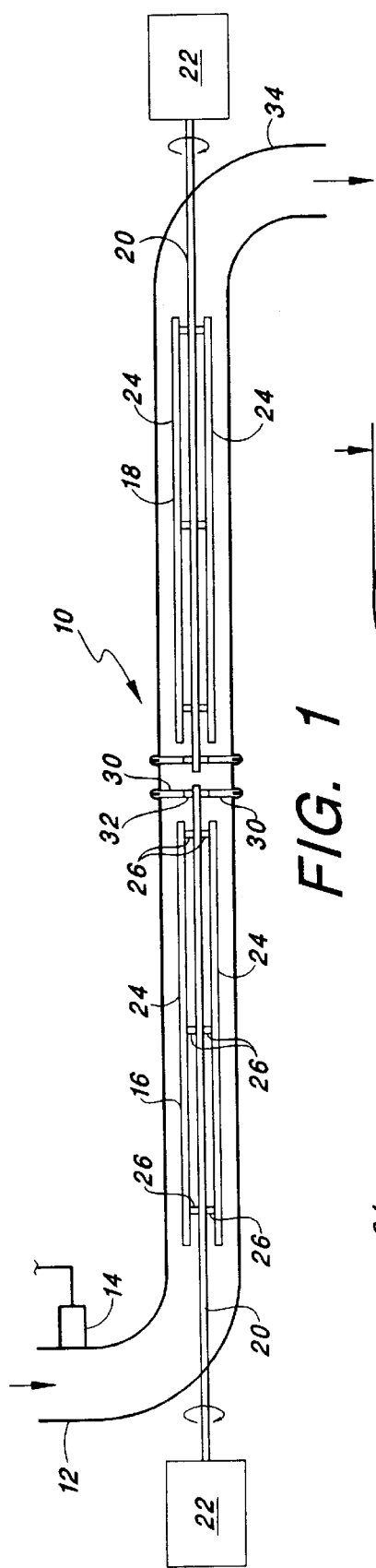
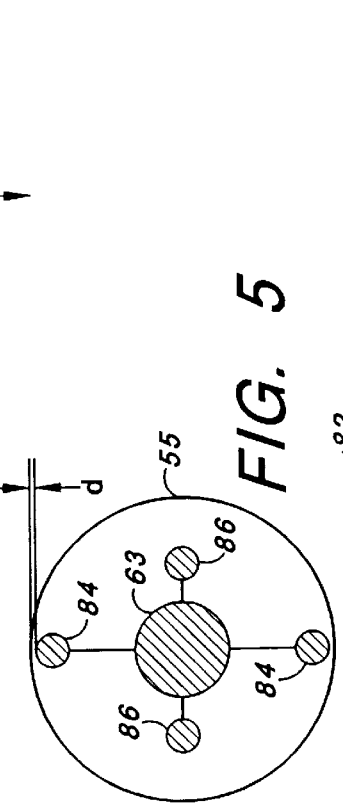
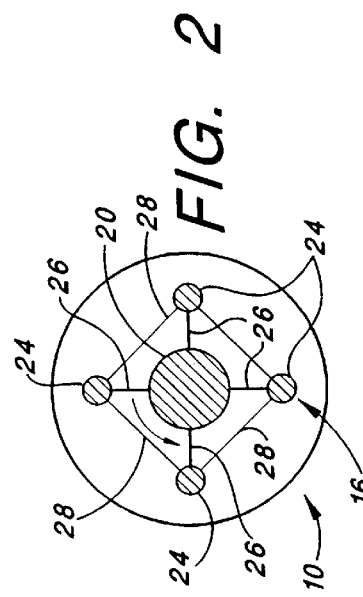
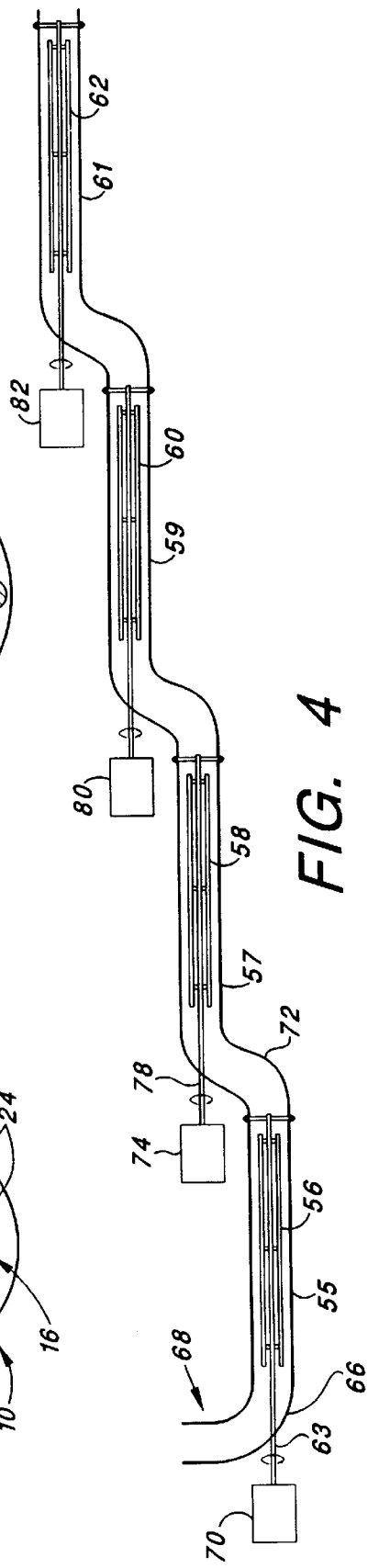

METHOD FOR CONTINUOUS MANUFACTURE OF VISCOUS FOOD PRODUCTS

CROSS-REFERENCE TO RELATED APPLICATION

This is a continuation-in-part of application Ser. No. 766,292 filed Dec. 13, 1996, now abandoned.

FIELD OF THE INVENTION

The present invention relates generally to processing of viscous food products such as process cheese-type products. More particularly, the present invention relates to a continuous in-line method and apparatus for the control of cooking in the manufacture of viscous food products.

BACKGROUND OF THE INVENTION

Natural cheese is generally made by developing acidity in milk and setting the milk with a clotting agent, such as rennet, or by developing acidity to the isoelectric point of the protein. The set milk is cut and whey is separated from the resulting curd. The curd may be pressed to provide a cheese block. Curing typically takes place over a period of time under controlled conditions.

Products having flavor and body characteristics similar to those of natural cheese have been made by replacing at least a portion of the animal fat of the milk with a vegetable fat such as corn oil, and/or by replacing at least a portion of the casein of the milk with an analog protein.

It is well known to provide a product having some of the characteristics of natural cheese by grinding a natural cheese, and heating it with an emulsifying salt. The name given to the resulting product depends upon the ingredients used and its composition and, in some instances, is determined by regulations promulgated by the U.S. Food and Drug Administration 21 C.F.R. §133.169–180. For example, the term "pasteurized process cheese" refers to a product comprising a blend of cheeses to which an emulsifying agent, usually an emulsifying salt, and possibly acids, have been added, and which has then been worked and heated into a homogeneous plastic mass.

The term "pasteurized process cheese food" refers to a product which is prepared from the same materials and the same processes used for manufacture of process cheese. However, cheese food generally has dairy ingredients added thereto, such as cream, milk, skimmed milk, whey, or any of these from which part of the water has been removed (e.g., concentrated skimmed milk). The moisture level in process cheese food is generally higher than that of process cheese and may be up to about 44%. Fat is generally present at a level of not less than 23%.

The term "pasteurized process cheese spread" refers to a product which is similar to cheese food, in the sense that it can contain the indicated dairy ingredients. Process cheese spread, however, may have a moisture level as high as 60%, and a minimum fat level of 20%.

Process cheese, process cheese food and process cheese spread are referred to as "standardized products", since their methods of manufacture and composition are determined by Federal Standards of Identity.

As used herein, the term "process cheese-type products" includes those products known and referred to as "pasteurized process cheese", "pasteurized process cheese food", "pasteurized process cheese spread", and "pasteurized process cheese product". "Process cheese type-products" also includes products resembling process cheese, process cheese food, process cheese spread and process cheese product, but which may not meet the U.S. Federal Standards of Identity for any of the above products in that they may contain ingredients not specified by such Standards, such as vegetable oil or vegetable protein, or may not meet the compositional requirements of such Standards. Process cheese-type products also include products having flavor and texture similar to those of a process cheese-type product regardless of the ingredients or manufacturing steps employed, and regardless of whether the Standards have been met.

In prior manufacture of process cheese-type products, two forms of batch cookers have been generally known, one being a steam jacketed kettle equipped with a mechanical agitator and the other being a horizontally extending cooker also known as a "lay-down" cooker having a screw in the cooker chamber. Live steam is injected directly into the chamber and the raw material at atmospheric pressure as the raw material is agitated by the screw. The raw material is heated in the cooker to a temperature of at least 150° F., usually about 160° F. to 190° F., and is held at that temperature for at least 30 seconds, and usually for about 5 minutes, depending in part upon the raw material and the desired cheese product.

The conventional cheese cookers used in the manufacture of process cheese products are essentially batch-type cookers in which an amount of raw material is introduced into the cooker, and heated and agitated to provide a homogenized molten mass. The molten mass is then intermittently discharged from the cooker for appropriate handling.

The design and operation of the cooker is critical in obtaining a good process cheese product. Mere heating of the cheese blend without proper agitation results in separation of the fat, thus failing to provide a satisfactory emulsion. Too much agitation during heating results in overemulsification and a process cheese product having undesirable body characteristics. Also, maintenance of the process cheese at the cooking temperatures for an extended period of time is undesirable and burn-on of the cheese onto the sides of cookers has been a problem.

When the cheese has been cooked to the degree desired, the molten process cheese product is withdrawn from the cooker, cooled to a proper packaging or filling temperature, and packaged. Packaging may take any one of a number of forms. For example, the product may be packaged in loaves or in jars. Alternatively, the molten process cheese product may be formed into slices by distributing the product upon the surface of a cooled rotating chill roll in the form of a thin layer which solidifies into a sheet or ribbon, removing the sheet or ribbon from the chilled surface of the roll, and cutting it into individual slices.

Considerable research has been expended to understand the physical and chemical processes which occur during the manufacture of process cheese-type products. In order for process cheese-type products to have the correct texture, flavor, and meltability attributes, they must undergo a specific temperature and shear history. A certain time at elevated temperatures is required to cook the cheese curd into a continuous phase and to eliminate or minimize the presence of uncooked cheese or "curd specks". In addition to the elevated temperature, a certain degree of agitation at specific shear values is required to facilitate the melting of the cheese and to emulsify the fat in the system.

In one known prior art process for the manufacture of a process cheese-type product, the formulation is subjected to shear in a range of between 10 and 1,000 sec$^{-1}$, and the formulation has an absolute viscosity of between about 20 and 50 poise when subjected to shear within this range.

If the shear is excessive, the fat may become over-emulsified, causing defective texture, i.e., the process cheese-type product may become too firm and rubbery and may have restricted melting ability in applications such as hot sandwiches. Hence, the amount of time the process cheese-type product experiences given conditions of shear and temperature may be critical to the finished product attributes.

In the past, continuous processes have been proposed as alternatives to batch processes for manufacture of process cheese-type products. However, one of the problems associated with continuous manufacturing processes is that, where a particular line or apparatus is intended for use in producing more than one type of product, it is generally difficult to provide for a smooth and clean transition from one product to the next, without extensive intermixing of the first product and the second product during the transition period. This is due in part to the fact that plug flow is difficult or impossible to maintain in the context of continuous production of process cheese-type products.

Accordingly, it is a general object of the invention to provide an improved method and apparatus for manufacturing viscous food products.

It is a further object of the invention to provide an improved method and apparatus for manufacturing process cheese-type products which enables a transition to be made from manufacture of a first process cheese-type product to manufacture of a second process cheese-type product without excessive intermixing of the first and second product in the continuous manufacturing operation.

It is a further object of the invention to provide such apparatus for the continuous manufacture of process cheese-type products wherein the apparatus may be cleaned in place, i.e., cleaned without disassembly.

It is a further object of the invention to provide a continuous method for the manufacture of process cheese-type products wherein the shear, temperature, and residence time are controlled to provide a process cheese-type product having the correct texture, flavor, and meltability attributes.

Another object of the present invention is to provide a method and apparatus for the continuous in-line cooking of a process cheese-type formulation, particularly by the direct introduction of steam into a flowing stream of the raw materials used to provide the process cheese-type product.

These and other objects of the invention will become apparent from the following detailed description and the attached drawings.

DESCRIPTION OF THE DRAWINGS

FIG. 1 is a schematic longitudinal sectional view of apparatus in accordance with an embodiment of the invention;

FIG. 2 is a schematic cross-sectional view of the apparatus of FIG. 1;

FIG. 4 is a schematic longitudinal view of apparatus in accordance with a third embodiment of the invention;

FIG. 5 is a schematic cross-sectional view illustrating one of the rotors of FIG. 4.

SUMMARY OF THE INVENTION

Figure 3:
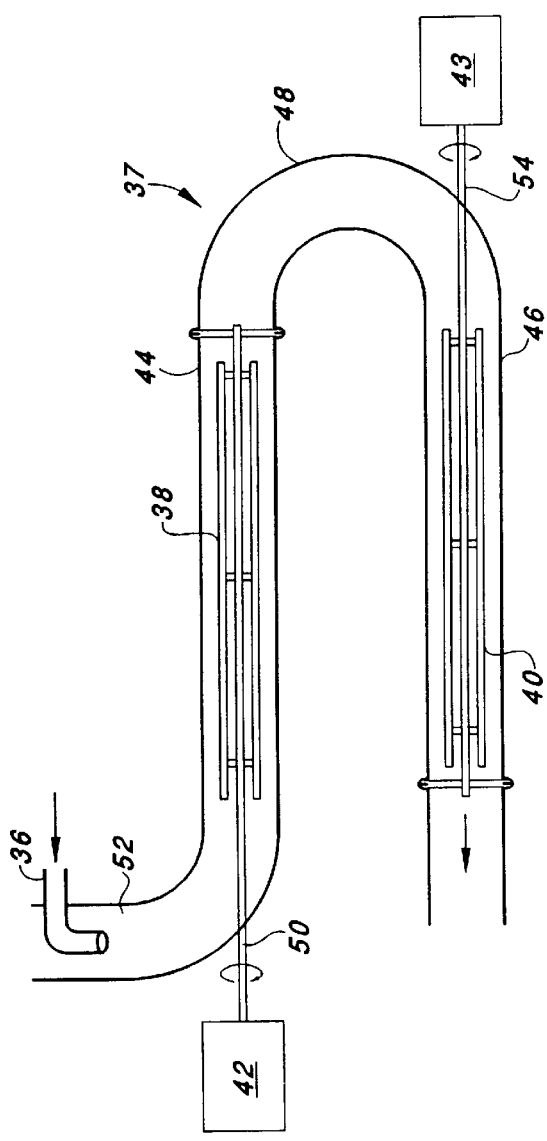
FIG. 3 is a schematic longitudinal sectional view of apparatus in accordance with a second embodiment of the invention.

In accordance with the invention, there is provided a method and apparatus for continuous manufacture of viscous food products wherein a product formulation which is at an elevated temperature flows through a processing chamber assembly comprising an elongated tube or housing having a rotor which shears the formulation as it travels longitudinally through the tube while imparting minimal axial motion to the formulation as a result of contact with the rotor. Thus, in contrast with prior art auger or screw mechanisms, which impart axial motion to material in contact with them as they rotate, the rotor in accordance with the present invention imparts circumferential motion to portions of the formulation while causing minimal back mixing or other axial displacement when rotated at an optimal speed, which may vary depending on the specific products characteristics. Thus, the method and apparatus of the invention enable control of particle residence time in the cooking apparatus, and enable mixing of the formulation to be achieved with reduced variation in the axial components of the flow velocities of particles at varying distances from the central axis of the tube. Although the method and apparatus of the invention do not enable an idealized flow in which all particles have exactly uniform axial velocity components, the method and apparatus are believed to significantly improve the uniformity of axial flow velocity among various particles of the process cheese-type formulation or other viscous product.

DETAILED DESCRIPTION OF PREFERRED EMBODIMENTS

The present invention is generally embodied in a method and apparatus for continuous cooking or transport of process cheese-type products, or other viscous materials. The method and apparatus preferably employ a novel processing chamber which comprises a rotor for improving uniformity of product residence time among various particles of a process cheese-type formulation proceeding through an elongated tubular processing chamber at controlled temperatures and pressures, while imparting controlled shear to the formulation.

Apparatus in accordance with a first embodiment of the invention is illustrated in FIGS. 1 and 2. The apparatus in FIGS. 1 and 2 generally comprises an elongated tubular processing chamber 10 of generally cylindrical shape and substantially circular cross-section. A process cheese-type product formulation is transferred to a positive displacement pump from which it flows into the processing chamber through an inlet conduit 12 which may be continuous with the processing chamber. A steam injector 14 is provided a short distance upstream from the processing chamber to enable injection of a controlled quantity of steam into the formulation as it proceeds toward the processing chamber. The formulation enters the processing chamber at a temperature of from about 150° F. to about 250° F. Since no heat is applied to the formulation as it flows through the processing chamber, there is a temperature drop of from about 5° F. to about 10° F. It should be understood that cooking of the formulation is initiated by the injection of steam into the formulation before the formulation enters the processing chamber. Cooking is finished by shear imparted to the formulation as it flows through the processing chamber.

Two independently driven rotors 16 and 18 are provided in the processing chamber, arranged end-to-end in longitudinal series for successive engagement with the formulation as it proceeds downstream through the processing chamber 10. Each of the rotors 16 and 18 comprises a central drive shaft 20 which is connected at one end to a drive motor 22, and is rotatably supported by a suitable support 32 such as a bearing, bushing, or the like, at its opposite end. A plurality of parallel, axially extending rods 24 are disposed parallel to and spaced from the rotor drive shaft 20 and rigidly connected thereto for rotation therewith. In the embodiment illustrated in FIGS. 1 and 2, the longitudinal rods 24 are of circular cross-section, as is the central drive shaft 20, and the rods are connected to the drive shaft by radially extending spokes 26. In the embodiment of FIG. 2, the spokes 26 are of substantially uniform length, and the rods are accordingly spaced at substantially equal distances from the interior surface of the chamber 10. In other embodiments, e.g., the embodiment shown in FIG. 5, the rods may be disposed at variable distances from the drive shaft.

In the embodiment of FIG. 2, to increase the stiffness and rigidity of the rotor 18, adjacent rods are connected to one another by braces 28. The braces and radial supports are preferably disposed transversely, i.e., each of the braces 28 and radial spokes 26 lies substantially in a plane perpendicular to the axis of the rotor, and is configured so that the rotation of the rotor has little or no effect on the axial velocity of the formulation as it proceeds through the cooker assembly. The braces 28 and spokes 26 may be of circular, rectangular, or other cross-section.

The support 32 for the end of the drive shaft 20 opposite the motor is preferably also supported by radially extending supports 30 which do not excessively impede the flow of the formulation through the chamber.

As shown in FIG. 1, after proceeding through the processing chamber 10, the formulation travels through an outlet conduit 34 to a filler or other destination.

The inlet and outlet conduits 12 and 34 are angled relative to the processing chamber 10 in the embodiment of FIG. 1 to facilitate connection of the drive motors to the respective rotors. It is generally desirable to minimize nonlinearity of the conduits, and to this end the angle between the outlet conduit 34 and the processing chamber 10 preferably is greater than 90°, and may be about 135° or more. In particular, the first rotor 16 has its drive shaft 20 extending through a curved portion of the inlet conduit 12 immediately upstream from the processing chamber 10, and the drive shaft 20 of the second rotor 18 extends through the wall of the outlet conduit a short distance downstream from the downstream end of the second rotor 18.

In a second embodiment of the invention, illustrated in FIG. 3, a generally U-shaped configuration is employed for the processing chamber. As in the embodiment of FIGS. 1 and 2, means 36 for injecting steam are provided a short distance upstream of a processing chamber 37, and first and second rotors 38 and 40, driven by respective motors 42 and 43, are provided in the processing chamber 37. However, in the embodiment of FIG. 3, in contrast with that of FIG. 1, the processing chamber comprises first and second portions 44 and 46 which are spaced from and parallel to one another, joined by a U-shaped conduit 48. For maximum efficiency, the length of the straight sections should be maximized with respect to any curved or U-shaped sections.

The drive shaft 50 connecting the first motor 42 to the first rotor 38 extends through a curved section of inlet conduit 52 a short distance upstream from the first rotor. The second motor 43 is connected to the second rotor 40 by a drive shaft 54 which extends through a curved portion of the U-shaped conduit 48 connecting the first and second sections of the processing chamber.

In other embodiments, the number of rotor assemblies may exceed two, to provide whatever length is desired, and in the embodiment of FIG. 4, four rotor assemblies 56, 58, 60, and 62 are disposed within respective associated processing chamber sections 55, 57, 59, and 61. In the embodiment of FIG. 4, the drive shaft 63 of the first rotor 56 extends through a curved portion 66 of an inlet conduit 68 upstream of the first rotor 56 as in the previously described embodiments, for connection to a first motor 70, and the opposite end of the drive shaft is supported in a manner similar to that described in the above embodiments. Immediately downstream from the second rotor 58 is a generally S-shaped conduit 72 which enables second and third drive motors 74 and 80 to be connected to the second and third rotors 58 and 60 with the drive shaft 78 of the second rotor 58 and the drive shaft of the third rotor 60 extending through a curved or angled wall of the S-shaped conduit 72. The drive shaft of the fourth rotor 62 extends through a curved or angled portion of an outlet conduit downstream from the fourth chamber 61.

Thus, in the embodiment of FIG. 4, the processing chamber comprises two main sections which are longitudinally and transversely displaced from one another to facilitate connection of drive motors to their associated rotors. It should be appreciated that the employment of a plurality of processing chamber sections longitudinally and transversely offset from one another may be employed with more than two sections, as required for particular applications, to comply with particular sets of process parameters.

FIG. 5 illustrates one of the rotors 56 of FIG. 4. The illustrated rotor 56 employs variations in the distances in which respective pairs of rods 84 and 86 are spaced from the drive shaft 63. It will be appreciated that this arrangement, or similar arrangements, may be employed with other embodiments as well. In the embodiment of FIG. 5, a first pair of rods 84 is disposed at a first predetermined radial distance from the axis of the drive shaft, and a second pair of rods 86 is disposed at a second radius from the central axis of the draft shaft. In one particular embodiment of the invention, for purposes of the example, the first pair of rods 84 are disposed with spacing of between about 0.1 in. and 0.2 in. from the interior wall of the processing chamber, and preferably at a spacing of about 0.15 in. from the interior surface of the processing chamber, with the other pair of rods 86 being spaced at a clearance of between about 0.4 in. and 0.5 in. therefrom. The clearance for the first pair of rods 84 is indicated as "d" in FIG. 5. In each pair, both rods are spaced the same distance from the rotor axis for dynamic balance.

Figure 6:
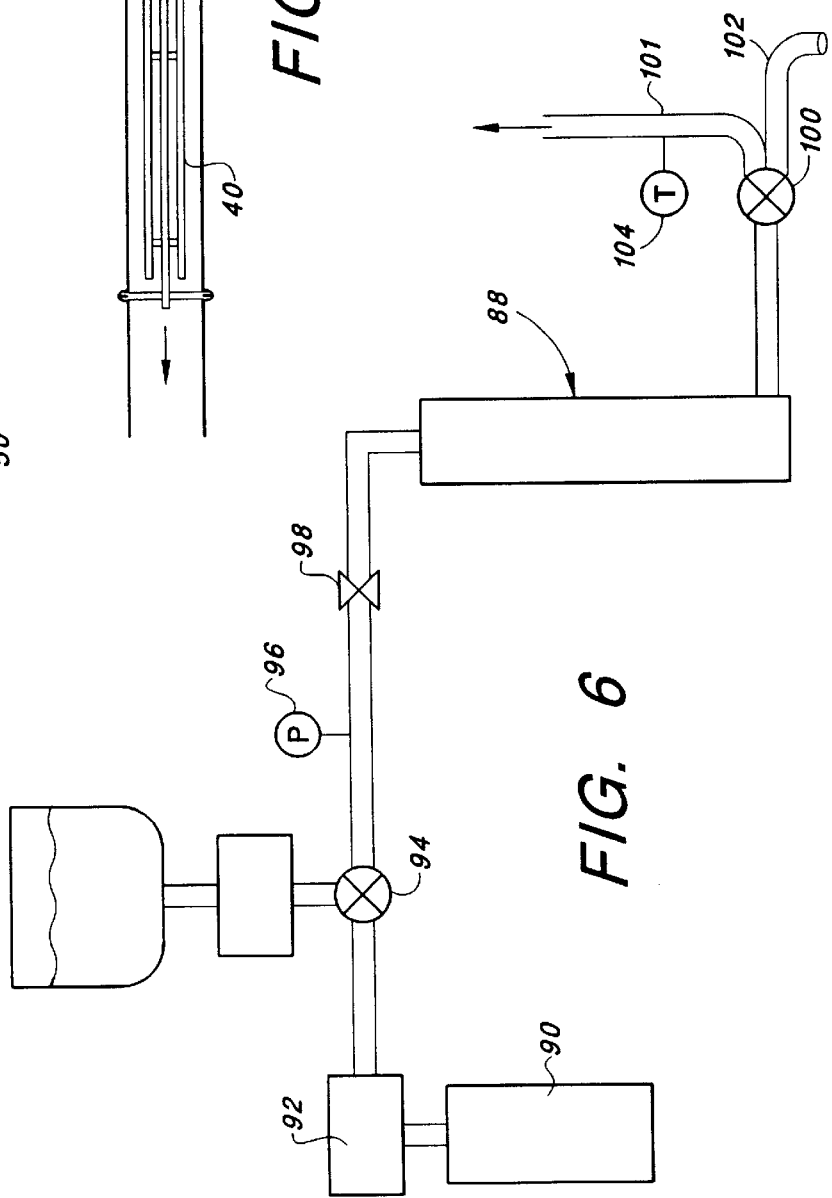
FIG. 6 is a diagrammatic plan view of apparatus in accordance with a fourth embodiment of the invention.

FIG. 6 illustrates apparatus in accordance with a fourth embodiment of the invention, which incorporates a processing chamber 88 for production of process cheese-type products. In the apparatus of FIG. 6, an auger 90 is employed to deliver cheese to a positive displacement pump 92. A steam infusion device 98 injects a measured quantity of steam into the mixture as it flows downstream. After injection of steam, the formulation is received in the processing chamber 88 which may comprise any of the embodiments described above, or may comprise a different embodiment of the invention. After flowing through the processing chamber 88, the formulation exits the processing chamber and is collected or packaged.

The temperature of the formulation as it proceeds through the processing chamber 88 is at least 150° F., preferably in the range of about 150° F. to about 250° F., and most preferably from about 175° F. to about 225° F. The residence time of the formulation in the processing chamber 88 is preferably between about 30 seconds and about 8 minutes, with a preferred residence time of between about 1 minute and about 3 minutes. The flow within the processing chamber 88 is preferably turbulent, to improve uniformity of axial flow components of various particles of the formulation proceeding therethrough. The shear imparted to said formulation as it flows through the processing chamber is in the range of from about 10 to about 1000 $\text{sec}^{-1}$ preferably from about 50 to about 250 $\text{sec}^{-1}$. The viscosity of the formulation as it flows through the processing chamber is from about 30 to about 100 cp.

The processing chamber preferably has a length-to-diameter ratio "L/D" of at least about 6:1. In one embodiment of the invention, for example, the cooker has a length-to-diameter ratio L/D of between 15:1 and 80:1.

In one particular embodiment, the temperature in the processing chamber 88 is maintained at an entrance temperature of about 210° F., an exit temperature of about 200° F., the formulation is subjected to shear of between 10 and 1,000 $\text{sec}^{-1}$, and the absolute viscosity $\mu$ of the formulation is between about 20 and 50 poise. The rotor is operated at a rotational velocity of between about 10 rpm and about 800 rpm.

From the foregoing, it should be appreciated that the invention is not limited to the embodiments described above or to any particular embodiments of the invention. The invention is further described and more particularly pointed out in the following claims.

What is claimed is:

1. A method of processing a viscous food product comprising:

providing a flowing stream of a viscous food product;

injecting steam into said stream;

introducing said stream into an elongated chamber having an elongated generally cylindrical wall of substantially circular cross-section;

effecting flow of a continuous stream of a viscous food product through said chamber after injecting steam into said viscous food product upstream of said elongated chamber;

rotating an elongated rotor in said stream along substantially the entire length of said chamber to displace particles in said stream transversely with at most only a minimal effect on the axial displacement of said particles.

2. A method in accordance with claim 1 wherein said flow is turbulent.

3. A method in accordance with claim 1 wherein said viscous food product is a process cheese-type product.

4. A method in accordance with claim 1 wherein said rotor does not contact the interior of said generally cylindrical wall.

5. A method in accordance with claim 1 wherein said rotor is rotated at a rotational velocity of at least about 5 rpm.

6. A method in accordance with claim 1 wherein said rotor is rotated at a rotational velocity of between about 10 rpm and about 800 rpm.

7. A method in accordance with claim 1 wherein the entrance temperature of said stream into said chamber is from about 150° F. to about 250° F. and the exit temperature from said chamber is from about 5° F. to about 10° F. less than the entrance temperature.

8. A method in accordance with claim 1 wherein the residence time in said chamber is from about 30 seconds to about 8 minutes.

9. A method in accordance with claim 1 wherein the residence time in said chamber is from about 2 minutes to about 4 minutes.

10. A method in accordance with claim 1 wherein the entrance temperature of said stream into said chamber is from about 175° F. to about 225° F.

11. A method in accordance with claim 1 wherein said rotor comprises a central, axial drive shaft, a plurality of elongated rods extending parallel to said drive shaft and spaced radially outward therefrom, and a plurality of transverse supports extending between and along said drive shaft and said rods, said supports being disposed substantially in transverse planes perpendicular to said drive shaft.

12. A method in accordance with claim 1 wherein said stream is subjected to a shear of from about 10 to about 1000 $\text{sec}^{-1}$ as it flows through said chamber.

* * * * *